US008453474B2

(12) United States Patent
Eisenhour

(10) Patent No.: US 8,453,474 B2
(45) Date of Patent: Jun. 4, 2013

(54) VEHICLE AIR HANDLING SYSTEM

(75) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 787 days.

(21) Appl. No.: 12/509,932

(22) Filed: Jul. 27, 2009

(65) Prior Publication Data

US 2011/0016902 A1    Jan. 27, 2011

(51) Int. Cl.
*F25D 23/00*    (2006.01)
*F25D 17/06*    (2006.01)
*F25B 27/00*    (2006.01)
*F28D 17/00*    (2006.01)
*F28D 7/02*    (2006.01)
*F28B 3/00*    (2006.01)
*G05D 23/00*    (2006.01)
*B01D 53/02*    (2006.01)
*B01D 59/26*    (2006.01)
*B01D 41/00*    (2006.01)

(52) U.S. Cl.
USPC .............. 62/271; 62/94; 62/238.3; 62/238.1; 62/90; 62/93; 165/10; 165/909; 165/164; 165/280; 165/111; 96/146; 96/152; 96/139; 96/385.3; 95/117; 95/122

(58) Field of Classification Search
USPC ................. 62/271, 94, 238.3, 238.1, 90, 150, 62/93; 165/10, 909, 164; 96/146, 152, 139, 96/385.3; 95/117, 122
See application file for complete search history.

(56) References Cited

U.S. PATENT DOCUMENTS

| | | | | |
|---|---|---|---|---|
| 4,202,179 | A | * | 5/1980 | Shelley .............................. 62/79 |
| 5,092,135 | A | * | 3/1992 | Cameron ......................... 62/271 |
| 5,325,676 | A | * | 7/1994 | Meckler ............................ 62/93 |
| 5,327,739 | A | * | 7/1994 | Ingersoll et al. .................. 62/78 |
| 5,509,275 | A | * | 4/1996 | Bhatti et al. .................... 62/271 |
| 5,514,035 | A | | 5/1996 | Denniston |
| 5,653,115 | A | * | 8/1997 | Brickley et al. .................. 62/94 |
| 5,878,590 | A | | 3/1999 | Kadle et al. |
| 6,205,805 | B1 | * | 3/2001 | Takahashi et al. .............. 62/271 |
| 6,364,942 | B1 | * | 4/2002 | Felber et al. .................... 96/111 |
| 6,530,973 | B2 | | 3/2003 | Gielda |
| 7,080,505 | B2 | * | 7/2006 | Koermer et al. ................ 60/274 |
| 7,188,480 | B2 | | 3/2007 | Korin |
| 2002/0092419 | A1 | * | 7/2002 | Gielda ............................. 95/95 |

(Continued)

FOREIGN PATENT DOCUMENTS

JP    2008-284482    * 11/2008

*Primary Examiner* — Frantz Jules
*Assistant Examiner* — Erik Mendoza-Wilkenfel
(74) *Attorney, Agent, or Firm* — Global IP Counselors, LLP

(57) ABSTRACT

A vehicle air handling system includes an air handler, a desiccant assembly and a regeneration mechanism. The air handler has an air inlet configured to receive airflow into the air handler and an air outlet configured to direct the airflow from the air handler to a passenger compartment of a vehicle. The desiccant assembly is installed in a fixed non-movable orientation within the air handler. The desiccant assembly is configured to absorb moisture from the airflow and is disposed between the air inlet and the air outlet. The desiccant assembly includes a first flow path and a second flow path separated from one another such that the airflow passes through the first flow path. The regeneration mechanism is in fluid communication with the second air flow path of the desiccant assembly and is configured to remove moisture from the airflow passing through the desiccant assembly.

17 Claims, 11 Drawing Sheets

U.S. PATENT DOCUMENTS

2007/0163279 A1* 7/2007 Moffitt ............................ 62/271
2008/0093059 A1* 4/2008 Nishida ......................... 165/133
2009/0277195 A1* 11/2009 Viegas et al. ................... 62/115

* cited by examiner

VEHICLE AIR HANDLING SYSTEM

BACKGROUND OF THE INVENTION

1. Field of the Invention

The present invention relates to a vehicle air handling system that includes a moisture absorbing desiccant assembly. More specifically, the present invention relates to a vehicle air handling system where a moisture absorbing desiccant assembly includes a moisture absorbing section and a moisture releasing section.

2. Background Information

Vehicle air conditioning systems have been used in vehicles for many years and are continuously being improved. Such systems typically include a conventional compressor that compresses low pressure refrigerant into high pressure refrigerant, a condenser that dissipates heat (and energy) from the high pressure refrigerant, an expansion valve or similar throttling device that allows the high pressure refrigerant to expand (and thereby become low pressure refrigerant) and an evaporator that allows the low pressure refrigerant to absorb heat from a confined space such as the passenger compartment of the vehicle.

Such air conditioning systems also typically include an air handling mechanism that treats the airflow passing therethrough. For example, the air handling mechanism may include a fan or blower that directs airflow through the air handling mechanism. The air handling mechanism can include the evaporator of the air conditioning system. The airflow through the air handling mechanism can then be cooled as it passes by coils of the evaporator. As the airflow passes by the evaporator, moisture also condenses on the surfaces of the evaporator.

Typically during operation of the vehicle air conditioning system, it is possible to direct a selected portion or all of re-circulated air from within the passenger compartment along with a selected portion of ambient fresh air from outside the vehicle to flow into the air conditioning system. This mix of ambient air and re-circulated air defines the airflow passing through the air handling mechanism.

Regardless of the source of the airflow (re-circulated air or fresh ambient air), moisture in the airflow condenses on the surfaces of the evaporator coils. The energy consumed by the condensation of moisture on the surfaces of the evaporator is measurable. If the airflow is heavily laden with moisture (a high level of humidity), then the air conditioning system consumes a large portion of energy on removing the moisture rather than cooling the airflow. The consumption of energy is considerable and has a direct relationship with the potential energy efficiency of the air conditioning system. In order to improve the energy efficiency of the vehicle air conditioning system, it is advantageous to reduce the amount of moisture in the airflow prior to passage over the cooling surfaces of the evaporator.

Many air conditioning systems with moisture reducing devices have been proposed in recent years, including systems that use a desiccant material that absorbs moisture upstream from the evaporator. One such system is described in U.S. Pat. No. 5,327,739 to Ingersoll et al. that includes a desiccant chamber with a heater that drives off absorbed water. The desiccant chamber absorbs moisture but when the desiccant chamber becomes saturated with moisture, the heater must be turned on. While the heater is turned on, the desiccant chamber cannot be used. Thus, the system disclosed by Ingersoll et al. cannot continuously absorb moisture from the airflow passing through the disclosed system.

Other air conditioning systems that include desiccant materials require routine replacement of the desiccant material once the desiccant material becomes saturated with moisture.

In view of the above, it will be apparent to those skilled in the art from this disclosure that there exists a need for an improved vehicle air conditioning system that uses a desiccant material that can be used continuously without interruption and that does not require routine replacement. This invention addresses this need in the art as well as other needs, which will become apparent to those skilled in the art from this disclosure.

SUMMARY OF THE INVENTION

One object of the present invention is to provide an air conditioning system with a desiccant assembly that includes a desiccant material, which can be regenerated by adjusting the moisture retention properties of the desiccant material.

In accordance with one aspect of the present invention, a vehicle air handling system includes an air handler, a desiccant assembly and a regeneration mechanism. The air handler has an air inlet configured to receive airflow into the air handler and an air outlet configured to direct the airflow from the air handler to a passenger compartment of a vehicle. The air outlet is located downstream from the air inlet. The desiccant assembly is installed downstream from the air inlet and upstream from the air outlet in a fixed non-movable orientation within the air handler. The desiccant assembly is configured to absorb moisture from the airflow and has a first flow path and a second flow path separated from one another such that the airflow passes through the first flow path. The regeneration mechanism is in fluid communication with the second air flow path of the desiccant assembly and is configured to remove moisture from the airflow passing through the desiccant assembly.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
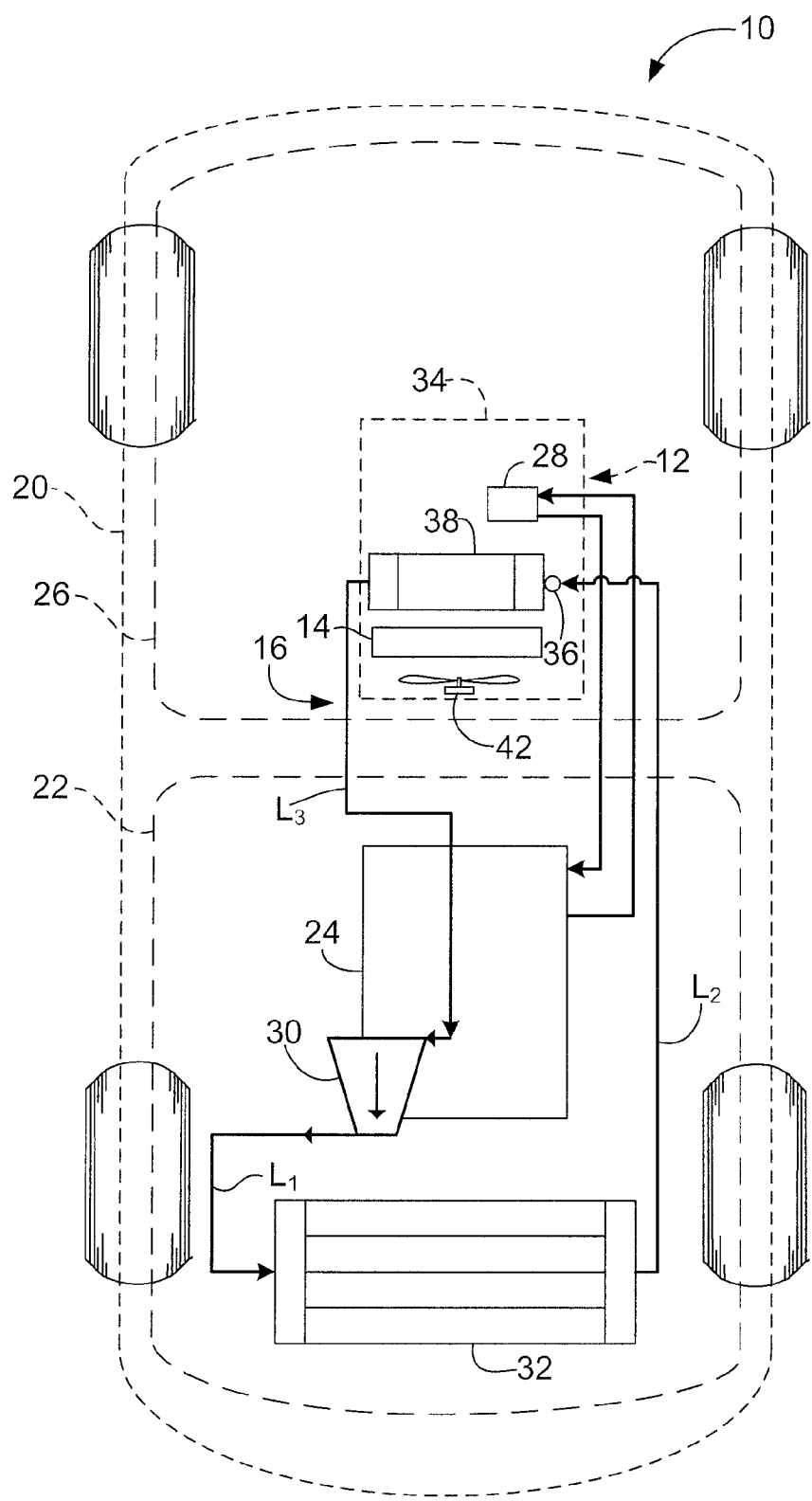
FIG. 1 is a schematic view of a vehicle that includes an air conditioning system including an air handling system in accordance with the present invention.

Referring initially to FIG. 1, a vehicle 10 that includes an air handling system 12 is illustrated in accordance with a first embodiment of the present invention. The air handling system 12 includes a desiccant assembly 14 that includes a moisture absorbing section and a moisture releasing section, as described in greater detail below.

As indicated in FIG. 1, the vehicle 10 basically includes, among other things, an air conditioning system 16, a vehicle body structure 20, an engine compartment 22 within the vehicle body structure 20, an internal combustion engine 24 within the engine compartment 22, a passenger compartment 26 and the air handling system 12. As described in greater detail below, the air conditioning system 16 includes a plurality of components, with some of those components being located in the engine compartment 22 and some components located in the passenger compartment 26.

The vehicle 10 also includes a heater core 28 that is in fluid communication with the engine 24 such that heated coolant from the engine 24 is selectively provided to the heater core 28 as needed, in a conventional manner. The vehicle body structure 20, the engine compartment 22, the internal combustion engine 24, the passenger compartment 26 and the heater core 28 are conventional elements. For example, the vehicle body structure 20 can be a passenger vehicle, a pick-up truck, a van, an SUV (sports utility vehicle) or a commercial vehicle such as a cargo carrying truck. In other words, the vehicle 10 can be any of a variety of different conventional vehicle designs that include an air conditioning system that maintains comfortable environment conditions for a driver and/or passengers within the vehicle. Since these vehicle components and designs are conventional, further description of these components is omitted for the sake of brevity Again with reference to FIG. 1, the air conditioning system 16 basically includes a compressor 30, a condenser 32, the air handling system 12 (which includes an air handler 34), an expansion valve 36, an evaporator 38 and the desiccant assembly 14 that absorbs moisture from airflow passing through the air handler 34, as described in greater detail below. The air conditioning system 16 also includes a control unit 40 shown in FIG. 2 and described in greater detail below.

As shown in FIG. 1, the compressor 14 and the condenser 30 are preferably located within the engine compartment 22. The heater core 28, the air handler 34, the expansion valve 36, the evaporator 38 and the desiccant assembly 14 are preferably located within the passenger compartment 26. However, it should be understood from the drawings and the description herein that the various components can be located in other appropriate locations within the vehicle 10. For example, the expansion valve 36 can be located anywhere downstream from the refrigerant flow out of the condenser 30 and upstream from the refrigerant flow to the evaporator 38 within either of the engine compartment 22 or the passenger compartment 26. However, in the depicted embodiment, the expansion valve 36 is located within the passenger compartment 26 adjacent to the evaporator 38.

During operation of the air conditioning system 16, the compressor 30 takes low pressure refrigerant and compresses it thereby increasing the temperature of the refrigerant. The compressed high pressure refrigerant exiting the compressor 30 is directed via a high pressure conduit $L_1$ to the condenser 32 where energy in the form of heat is dissipated from the refrigerant. Another high pressure conduit $L_2$ connects the condenser 32 and the expansion valve 36. The expansion valve 36 is a conventional air conditioning component that expands the high pressure refrigerant exiting the condenser 32 such that low pressure (and low temperature) refrigerant exits the expansion valve 36 and enters the evaporator 38 where air flowing through the evaporator 38 is cooled. A low pressure conduit $L_3$ connects the evaporator 38 to the compressor 30, where the low pressure refrigerant is compressed again by the compressor 30. Since the compressor 30, the condenser 32, the evaporator 38 and the expansion valve 36 are conventional components, further description is omitted for the sake of brevity.

It should be understood from the drawings and the description herein that the expansion valve 36 can be replaced with any of a variety of throttling devices, such as an orifice tube that only permits slow expansion of refrigerant from the mainly liquid compressed high pressure state to an at least partially vapor low pressure state.

Figure 2:
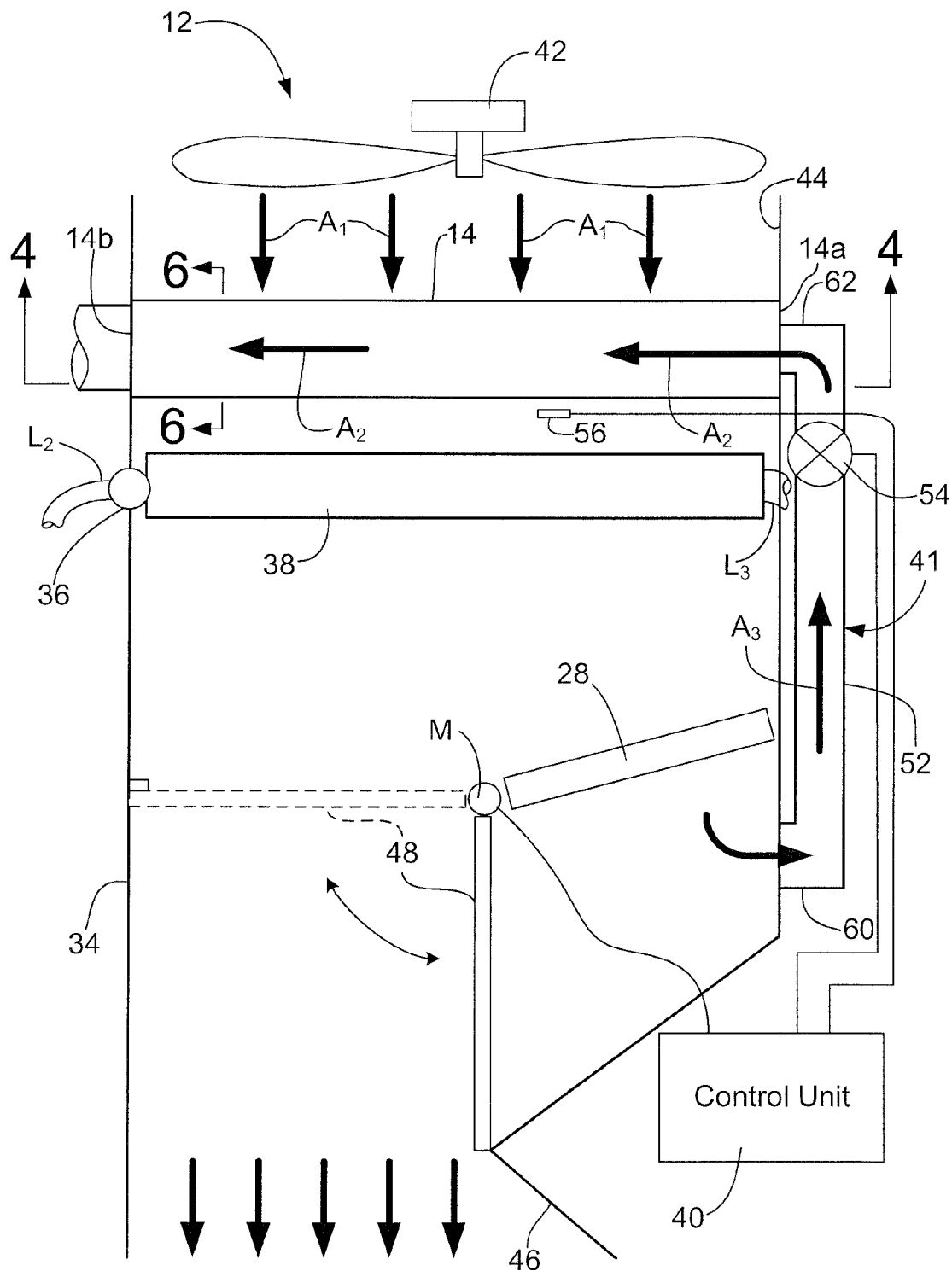
FIG. 2 is a schematic view of the air handling system depicted in FIG. 1, showing an air handling assembly, a regeneration mechanism and a desiccant assembly that has a first flow path configured to absorb moisture from air flowing therethrough and a second flow path configured to release moisture to air flowing therethrough in accordance with a first embodiment of the present invention.

With reference now to FIG. 2, a more detailed description of the air handling system 12 is now provided. The air handling system 12 is depicted as being part of the air conditioning system 16 of the vehicle 10. However, it should be understood from the drawings and the description herein that the air handling system 12 can be part of a simple ventilation system, part of a building air conditioning and ventilation system (HVAC) or part of the depicted air conditioning system 16 of the vehicle 10. In other words, the air handling system 12 is not limited to use in a vehicle, such as the vehicle 10.

The air handling system 12 basically includes the heater core 28, the air handler 34, the evaporator 38 (optional), the desiccant assembly 14, a regeneration mechanism 41 and a blower 42.

The air handler 34 is shown schematically in FIG. 2. The air handler 34 can have any of a variety of shapes and configurations depending upon size, shape and configuration of the vehicle 10. The present invention is operable with any of a variety of air handlers regardless of the type of vehicle. Therefore, for purposes of describing the present invention, a simple generically shaped rendering of the air handler 34 is depicted in FIG. 2. It should be understood from the drawings and the description herein that air handlers can have a variety of shapes and sizes depending upon the design of the vehicle 10, the features within the passenger compartment 26 and the cooling capacity of the air conditioning system 16. One function of the air handler 34 is to direct airflow through the elements installed within the structure of the air handler 34. For instance, the air handler 34 can be provided in a conventional manner with airflow from outside the vehicle 10 (ambient air) and/or re-circulated air from within the passenger compartment 26. The ambient air (from outside the vehicle 10) can be mixed with the re-circulated air and fed into the air handler 34. Most vehicles 10 include conventional ductwork and diverting baffles to allow selection of one or more mixtures of ambient air and re-circulated air in order to provide airflow into the air handler 34.

Further, ducts, baffles and air tubes can further direct treated air from the air handler 34 into the passenger compartment 26. Such ducts, baffles and air tubes are conventional and are therefore omitted from the drawings and description herein for the sake of brevity.

The air handler 34 is basically a housing or an air conduit shaped to direct the flow of air therethrough. As shown schematically in FIG. 2, the air handler 34 has a plurality of walls that define an inlet 44 and an outlet 46. As indicated in FIG. 2, the inlet 44 is preferably slightly larger than the outlet 46 such that air pressure within the air handler 34 is slightly elevated compared to outside the air handler 34.

Various elements of the air handling system 12 are installed within or on the structure of the air handler 34. Specifically, the blower 42, the desiccant assembly 14, the evaporator 38, an air blend door 48, the heater core 28, a heating duct 52 with a valve 54 and a moisture sensor 56 are all disposed within or on the air handling system 12.

The inlet 44 is configured to receive airflow from outside the vehicle 10. As mentioned above, the airflow into the inlet 44 can include re-circulated air from within the passenger compartment 26 and/or selected mixtures thereof with ambient outside air. Since selection and/or mixing of ambient air flow from outside the vehicle 10 and re-circulated air from within the passenger compartment 26 is conventional, further description of mixing and controlling air flow into the air handler 34 is omitted for the sake of brevity.

The outlet 46 is preferably connected to ducts or other conduits that direct air leaving the outlet 46 to the passenger compartment 26 in a conventional manner. The blower 42 is a conventional device that is preferably an electrically powered fan connected to and controlled by the control unit 40 (and passengers within the vehicle 10). The blower 42 is depicted as being mounted at or near the inlet 44. However, the blower 42 can be located at any of a variety of locations, such as upstream from the inlet 44, within the inlet 44, at the outlet 46 or any where within the vehicle 10 such that the blower 42 causes airflow into the inlet 44, though the air handler 34, toward and out of the outlet 46. Further, under selective conditions described below, the blower 42 can also direct air into the heating duct 52.

Therefore, the air handler 34 has the inlet 44 that is configured to receive ambient airflow and/or re-circulated air from the passenger compartment 26 (and mixtures thereof). The outlet 46 is configured to direct air from the air handler 34 to the passenger compartment 26 of the vehicle 10, with the outlet 46 being located downstream from the inlet 44.

In the following description, the terms "upstream" and "downstream" are used with respect to airflow through the air handler 34. For example, when the blower 42 is operating, air flows into the inlet 44 through the desiccant assembly 14, and then passes over the cooling surfaces of the evaporator 38. Further, when the air blend door 48 is opened in a manner described below, the air can also flow through the heater core 28. Therefore, as indicated in FIG. 2, the desiccant assembly 14 is located downstream from the inlet 44 because when the blower 42 is operating, air is directed to flow from the inlet 44 through the desiccant assembly 14. Similarly, the evaporator 38 is located downstream from the air inlet 44 and the desiccant assembly 14 because when operating, the blower 42 directs air to flow from the inlet 44, through the desiccant assembly 14 and subsequently over the cooling surfaces of the evaporator 38. Further, the desiccant assembly 14 is upstream from the evaporator 38 because when operating, the blower 42 directs air to flow from the desiccant assembly 14 over the cooling surfaces of the evaporator 38.

It should be understood from the drawings and the description herein that the blower 42 is a conventional air conditioning system component that is preferably controlled by an occupant within the vehicle 10. A control panel (not shown) provided within the passenger compartment 26 provides a passenger with the means to control the operation and speed of the blower 42 in a conventional manner.

The heater core 28 is located within the air handler 34 downstream from the desiccant assembly 14 and the evaporator 38. The air mix blend door 48 is disposed downstream from the heater core 28. The air mix blend door 48 is positionable in a conventional manner to control the mixture of heated air and cooled air exiting the air handler 34 through the outlet 46.

The air mix blend door 48 is a conventional device that is movable to a variety of positions to achieve a desired level of heating and/or cooling within the passenger compartment 26. The orientation of the air mix blend door 48 shown in solid lines in FIG. 2 is a ventilation or cooling orientation where the air flowing through the air handler 34 and out the outlet 46 can be cooled by the evaporator 38, but cannot be heated by the heater core 28. More specifically, in the orientation depicted in FIG. 2 in solid lines, the air mix blend door 48 seals a downstream side of the heater core 28, thus preventing the flow of air through the heater core 28. In the solid line position, the airflow bypasses the heater core 28 after passing through the evaporator 38.

The orientation shown in phantom lines in FIG. 2 of the air mix blend door 48 seals the air handler 34 such that all air flowing through the air handler 34 must pass through the heater core 28 and be heated. It should be understood from the drawings and description herein that the air mix blend door 48 can be positioned at any of a number of positions between the two positions (solid line and phantom line) depicted in FIG. 2. In other words, the air mix blend door 48 can be positioned to provide a variety of air mixtures where a selected portion of the air is allowed to pass through the heater core 28 and a selected portion of the air remains unheated. The heated and unheated portions of the air flow mix downstream from the air mix blend door 48 prior to exiting the outlet 46 of the air handler 34 to provide a desired level of heating and/or cooling of the air in the passenger compartment 26.

The position of the air mix blend door 48 is controlled by a conventional positioning device, such as a small stepper motor M shown in FIG. 2 that is operated by signals from the control unit 40.

The heating duct 52 is configured to capture a portion of the air heated by the heater core 28, and selectively direct that heated air to the desiccant assembly 14. The heating duct 52 is a conduit that includes an inlet end 60, an outlet end 62 and the valve 54. The valve 54 is operable to selectively restrict and permit the flow of heated air through the heating duct 52 and into the desiccant assembly 14. The inlet end 60 is in fluid communication with the interior of the air handler 34 downstream from the heater core 28. Hence, the inlet end 60 of the heating duct 52 is always supplied with heated air that has passed through the heater core 28 regardless of the orientation of the air mix blend door 48.

The outlet end 62 of the heating duct 52 is in fluid communication with an inlet side 14a (FIG. 2 only) of the desiccant assembly 14, as described below. The valve 54 is disposed within or formed with the heating duct 52 between the inlet end 60 and the outlet end 62. The valve 54 is basically any device that can selectively control the flow of air through an air conduit. For instance, the valve 54 can be a small door, similar to the air mix blend door 48 or can be a conventional valve that completely seals the heating duct 52 shut. Thus, the valve 54 can be set to completely block the flow of air through the heating duct 52 and can be set to allow free flow of air through the heating duct 52. The valve 54 includes a control device (not shown), such as a stepper motor or vacuum motor that is connected to the control unit 40 such that the control unit 40 controls operation of the valve 54.

The moisture sensor 56 is a conventional moisture sensing device that is located downstream (but adjacent to) the desiccant assembly 14 and upstream from the evaporator 38, as indicated in FIG. 2. The moisture sensor 56 is positioned to detect the level of moisture in the air exhausting from the desiccant assembly 14. The moisture sensor 56 is electrically connected to the control unit 40 such that signals from the moisture sensor 56 are received by the control unit 40. Operation of the control unit 40 is described in greater detail below.

The heater core 28, the heating duct 52 and the moisture sensor 56 define the regeneration mechanism 41 and are configured to remove moisture from the desiccant assembly 14, as described in greater detail below.

A description is now provided of the desiccant assembly 14 with specific reference to FIGS. 3-6. The desiccant assembly 14 is configured to absorb moisture from the ambient airflow moving through the air handler 34. The desiccant assembly 14 is disposed between the inlet 44 and the outlet 46 of the air handler 34 and is further disposed upstream from the evaporator 38 but downstream from the inlet 44. Hence as airflow passes through the desiccant assembly 14, moisture is removed by the desiccant assembly 14.

The desiccant assembly 14 further includes a moisture absorbing section and a moisture releasing section. The moisture absorbing section is defined in part by a first flow path represented by arrows $A_1$ and the moisture absorbing section is defined in part by a second flow path represented by the arrows $A_2$ in FIGS. 3 and 4. The first flow path $A_1$ and the second flow path $A_2$ are separated from one another such that the airflow through the air handler 34 only passes through the first flow path $A_1$ and heated air only passes through second flow path $A_2$.

As indicated in FIG. 2, the air entering the inlet 44 of the air handler 34 travels along the first flow path $A_1$ and passes through the moisture absorbing section of the desiccant assembly 14.

Figure 3:
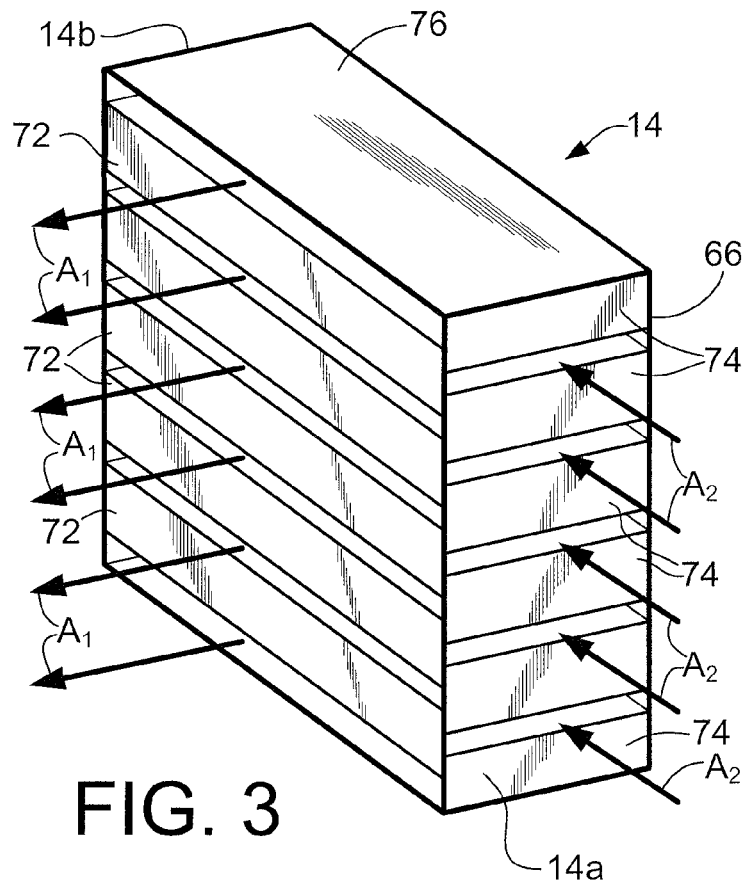
FIG. 3 is a perspective view of the desiccant assembly shown removed from the air handling assembly revealing a plurality of moisture absorbing channels that define the first flow path and a plurality of moisture releasing channels that define the second flow path in accordance with the first embodiment of the present invention.
Figure 4:
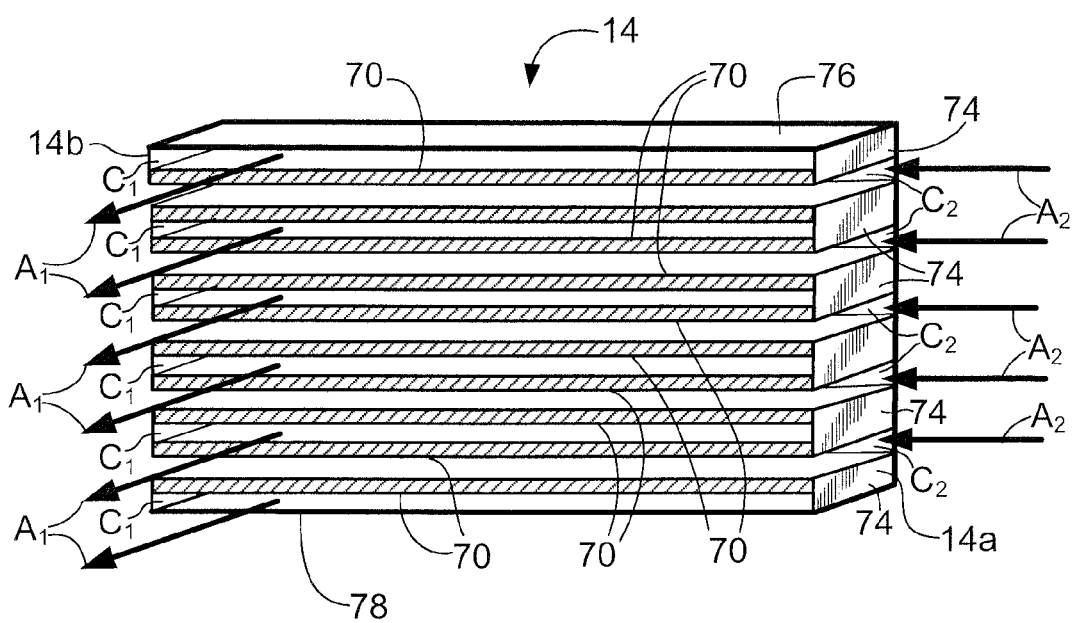
FIG. 4 is a perspective cross-sectional view of the desiccant assembly taken along the line 4-4 in FIG. 2, showing the plurality of moisture absorbing channels and the plurality of moisture releasing channels, and a plurality of desiccant material sections of a desiccant material that separate the plurality of moisture absorbing channels from the plurality of moisture releasing channels in accordance with the first embodiment of the present invention.
Figure 5:
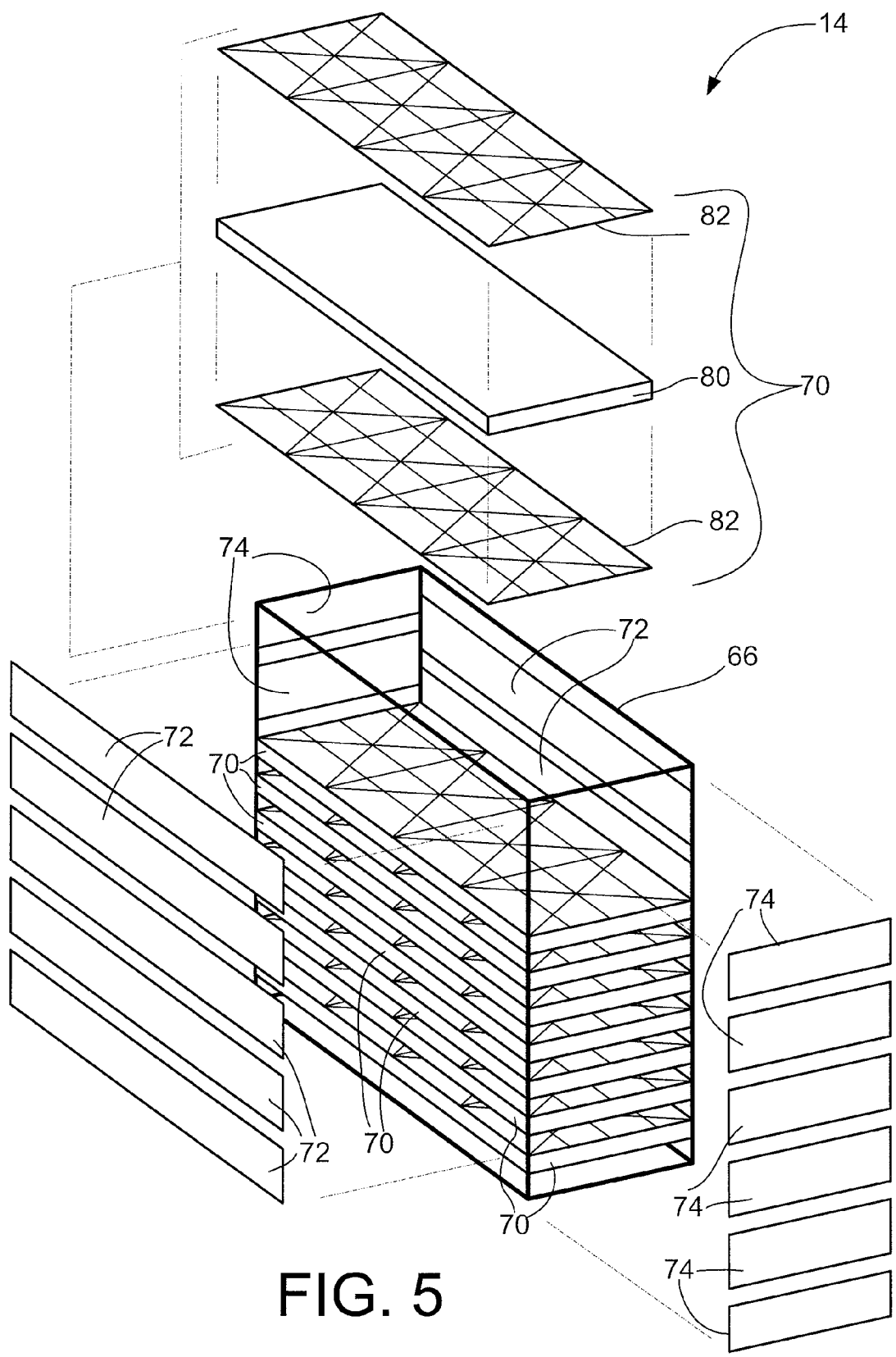
FIG. 5 is a schematic exploded view of the desiccant assembly, showing various structural components that retain the desiccant material sections of the desiccant material in position in order to define the plurality of moisture absorbing channels and the plurality of moisture releasing channels in accordance with the first embodiment of the present invention.

As best shown in FIGS. 3-5, the desiccant assembly 14 basically includes a frame 66, a plurality of desiccant material sections 70 (FIGS. 4 and 5), end panels 72 (FIGS. 3 and 5), end panels 74, a top panel 76 and a bottom panel 78 (FIG. 4 only).

The frame 66 is preferably a rigid construction that can be made of a plurality of wire-like or beam-like members. These members can be made of plastic, polymers and/or metal materials that are molded, welded or held together by adhesives to form the depicted frame 66.

There is a plurality of the desiccant material sections 70. The desiccant material sections 70 are preferably identical to one another. Therefore, description of one desiccant material section 70 applies to all. As best shown in FIG. 5, each of the desiccant material sections 70 basically includes a desiccant layer 80 and a pair of wire or mesh elements 82. One mesh element 82 is disposed below each desiccant layer 60 and one mesh element 82 is disposed above each desiccant layer 60.

The desiccant layer 80 can be a solid block of desiccant material or can be a loose packing of desiccant materials (moisture absorbing materials) that are held in place by pairs of the mesh elements 82. Each of the mesh elements 82 can be made of wire or a wire like material or mesh materials like nylon or other resilient but porous materials. The mesh elements 82 are constructed to maximize the exposed surface area of the desiccant layer 80 such that air flowing over this exposed surface area can interact with the desiccant layer 80. Specifically, moisture in the air flowing in the first flow path $A_1$ can be absorbed by the desiccant layer 80 and moisture absorbed by the desiccant layer 80 can be released into air flowing along the second flow path $A_2$. The size and configuration of the mesh elements 82 depends upon the nature of the desiccant layer 80. For instance, if the desiccant layer 80 is a relatively rigid material or semi-rigid material, then the mesh elements 82 can be made of an assembly of wire materials that merely hold the desiccant materials 80 in position. However, if the desiccant layer 80 has gelatinous physical characteristics that need rigid reinforcement, then the mesh elements 82 can include a mesh material reinforce with a wire or metallic frame.

A plurality of the desiccant material sections 70 is included in the desiccant assembly 14. Each of the desiccant material sections 70 are layered one above the next, but are spaced apart from one another in order to separate the first flow path $A_1$ from the second flow path $A_2$, as explained in greater detail below. In other words, the desiccant material sections 70 are layered one above another, but are separated from one another with alternating portions of the first flow path $A_1$ and the second flow path $A_2$ disposed therebetween, as indicated in FIG. 4.

More specifically, the first flow path $A_1$ includes a plurality of moisture absorbing channels $C_1$ that direct airflow in a first direction (corresponding to the arrows $A_1$). The second flow path $A_2$ includes a plurality of moisture releasing channels $C_2$ that direct air flow in a second direction (corresponding to the arrows $A_2$) that is perpendicular to the first direction (the arrows $A_1$). In other words, each one of the plurality of moisture absorbing channels $C_1$ is separated from an adjacent one of the plurality of moisture releasing channels $C_2$ by one of the desiccant material sections 70. More specifically, the plurality of desiccant material sections 70 define walls that separate adjacent ones of the plurality of moisture absorbing channels $C_1$ and the plurality of moisture releasing channels $C_2$.

Consequently, air flowing through each of the plurality of moisture absorbing channels $C_1$ flows over exposed surfaces of the corresponding desiccant layer 80. Hence, the desiccant layer 80 can absorb at least a portion of the moisture contained in the airflow.

Each of the desiccant material sections 70 is fixed to the frame 66 by adhesive or welding techniques, depending upon the material used to construct the frame 66 and the mesh elements 82.

The end panels 72 are long rectangular panels that are attached to the frame 66 by welding, molding and/or adhesives. The end panels 72 are spaced apart from one another such that space between adjacent ones of the end panels 72 defines an opening corresponding to one of the moisture absorbing channels $C_1$. Further, the end panels 72 seal respective sides of the plurality of moisture releasing channels $C_2$.

The end panels 74 are short rectangular panels that are attached to the frame 66 by welding, molding and/or adhesives. The end panels 72 are spaced apart from one another such that space between adjacent ones of the end panels 72 defines an opening corresponding to one of the plurality of moisture releasing channels $C_2$. Further, the end panels 72 seal respective sides of the plurality of moisture absorbing channels $C_1$.

The top panel 76 and the bottom panel 78 seal respective upper and lower ends of the desiccant assembly 14.

The desiccant layer 80 can be made of any of a variety of desiccant materials with moisture absorbing properties. For example, the desiccant layer 80 can be made with moisture absorbing silica gel and/or activated clay, such as Montmorillonite and/or Bentonite Clay. Depending upon the type of desiccant material employed in the desiccant assembly 14, the desiccant layer 80 can be retained within the frame 66 as solid or semi-solid blocks of material.

If the desiccant layer 80 is such that it can maintain a prescribed shape, then the plurality of moisture absorbing channels $C_1$ and the plurality of moisture releasing channels $C_2$ can alternatively be formed directly in the desiccant layer 80. In other words, the desiccant layer 80 can be dimensioned and shaped to define the plurality of moisture absorbing channels $C_1$ and the plurality of moisture releasing channels $C_2$ (the first and second flow paths $A_1$ and $A_2$) without the mesh elements 82. However, if the desiccant material 70 cannot retain the prescribed shape without reinforcement, then the mesh elements 82 can be arranged, shaped and dimensioned to retain the desiccant layer 80 in the prescribed shape. Further, the end panels 72 and 74 can alternatively be formed of the desiccant material.

Regardless of the type of desiccant material that makes up the desiccant layer 80 of the present invention, the plurality of moisture absorbing channels $C_1$ are sealed relative to the plurality of moisture releasing channels $C_2$. In other words, the air flowing through the plurality of moisture absorbing channels $C_1$ preferably does not leak into the plurality of moisture releasing channels $C_2$ and the air flowing through the plurality of moisture releasing channels $C_2$ preferably does not leak into the plurality of moisture absorbing channels $C_1$.

Figure 7:
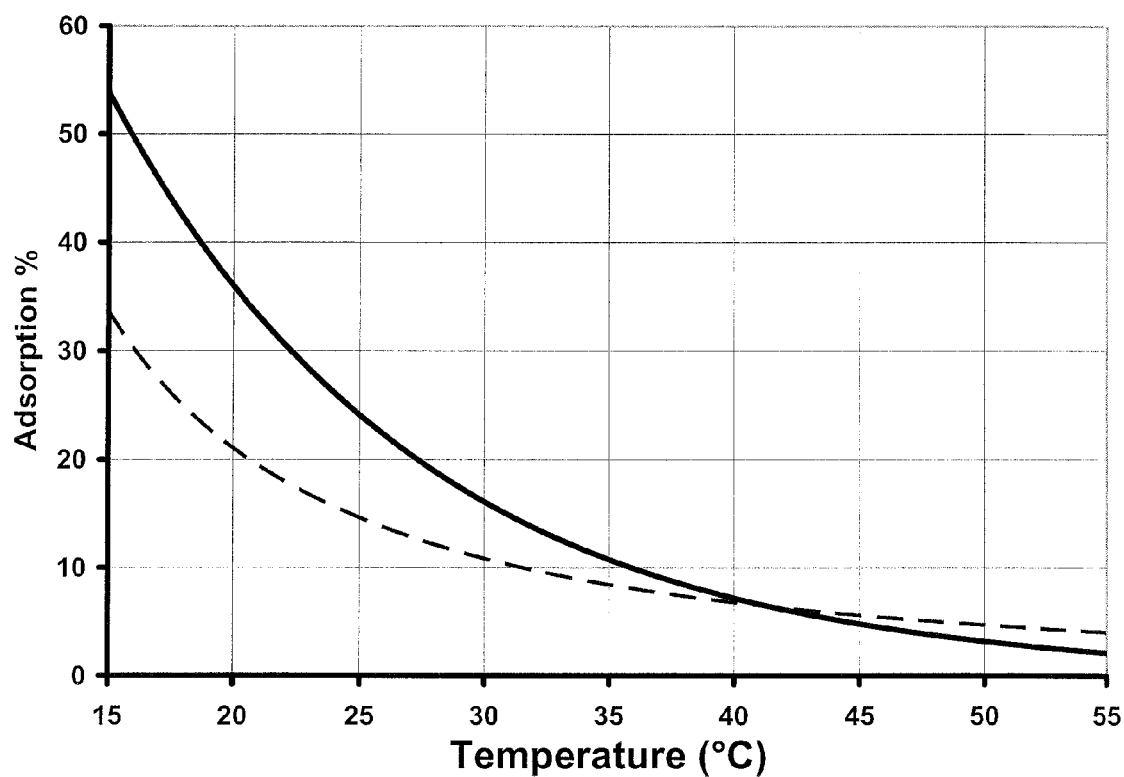
FIG. 7 is a chart depicting the relationship between temperature and absorption properties of desiccant materials in accordance with the present invention.

The moisture absorption and moisture retention characteristics of desiccant materials vary from material to material. However, the desiccant materials used in the present invention tend to release moisture when heated to a temperature that is greater than, for example, 50° C. Further, the desiccant materials used in the present invention tend to absorb moisture when cooled or maintained at a temperature that is less than, for example, 35° C. For instance, FIG. 7 is a chart representing the adsorption capacity of desiccant materials as a function of its temperature. In FIG. 7, the solid line represents the absorption properties of silica gel and the dashed or broken line represents absorption properties of Bentonite Clay. As indicated in FIG. 7, both desiccant materials have desirable moisture absorption properties at temperatures below 35° C. and more readily release moisture at temperatures greater than 50° C.

Therefore, preferably the temperature of the desiccant layers 80 is controlled by the present invention. However, most desiccant materials, such as Bentonite clay, do not have favorable heat conduction properties.

The present invention requires a desiccant material that absorbs moisture from air flowing along the first flow path $A_1$ and releases that moisture to air flowing along the second flow path $A_2$. In the depicted first embodiment, moisture is released to heated air flowing along the second flow path $A_2$. Consequently, it is desirable to establish and maintain a heat gradient within each of the desiccant layers 80. More specifically, it is desirable to repeatedly heat the second flow path (arrows $A_2$) side of each of the desiccant layers 80 to a temperature that is greater than the first flow path (arrows $A_1$) side of each of the desiccant layers 80 in order to drive off moisture. If the desiccant material used for the desiccant layers 80 has a low rate of thermal conductivity (for example, a rate of thermal conductivity that is less that the rate of thermal conductivity of water), each desiccant layer 80 can optionally be provided with heat conducting pins, such as heat conducting pins 86 (thermally conductive elements) and heat conducting pins 88 (thermally conductive elements), as depicted in FIG. 6.

Figure 6:
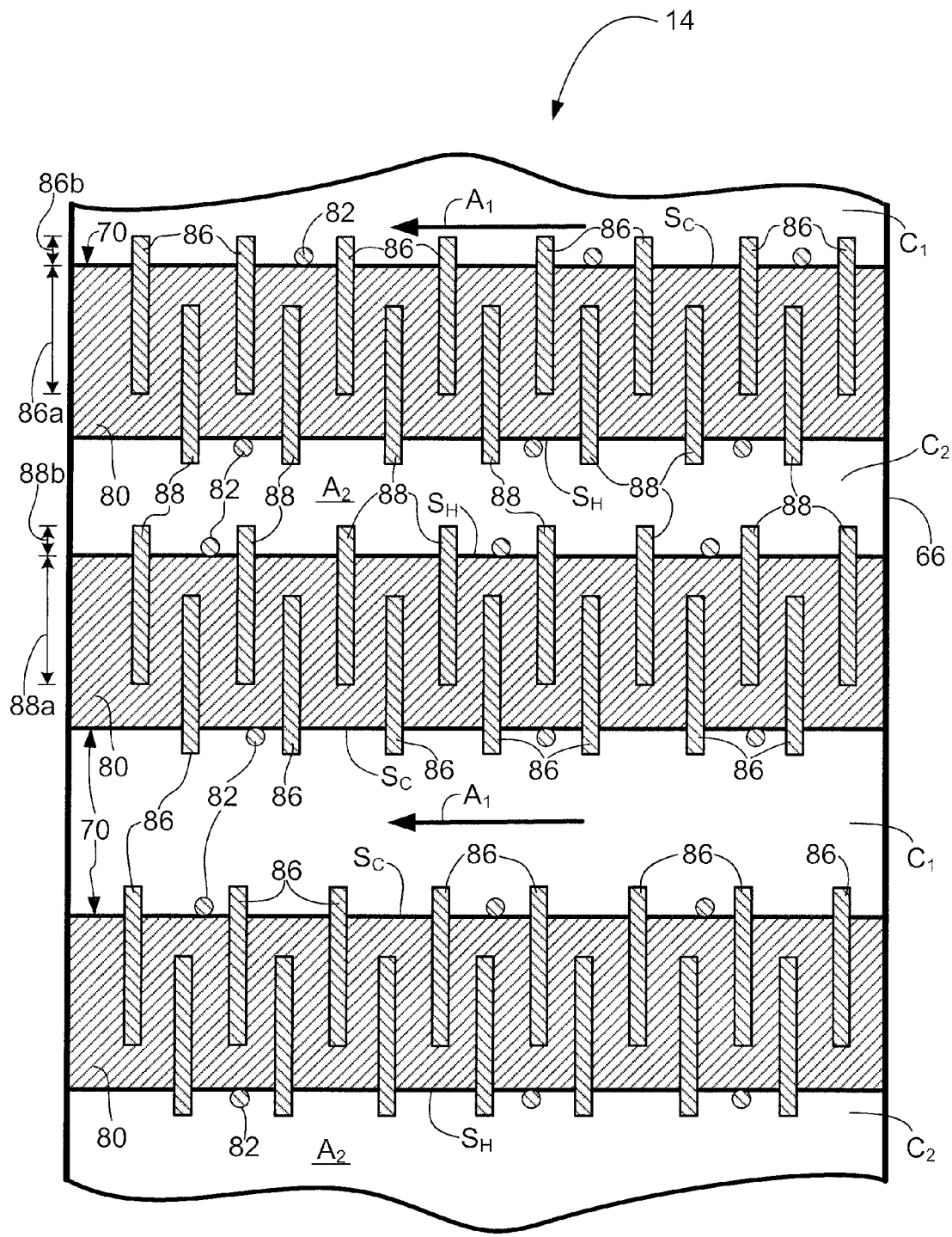
FIG. 6 is a cross-section of a portion of the desiccant assembly taken along the line 6-6 in FIG. 2 showing a plurality of heat conducting pins at least partially disposed within desiccant material in accordance with the first embodiment of the present invention.

As shown in FIG. 6, the heat conducting pins 86 extend into the desiccant layer 80. More specifically, each of the heat conducing pins 86 has an embedded section 86*a* and an exposed section 86*b*. The embedded sections 86*a* extend into the desiccant layer 80. The exposed sections 86*b* of the heat conducting pins 86 extend out of the desiccant layer 80 into adjacent ones of the moisture absorbing channels $C_1$ of the first flow paths $A_1$. Thus, the heat conducting pins 86 are disposed at a first flow path side of the desiccant material section 80 corresponding to the first flow path $A_1$. The desiccant layers 80 of the desiccant material sections 70 also include a plurality of heat conducting pins 88 that also extend into the desiccant layer 80. More specifically, each of the heat conducing pins 88 has an embedded section 88*a* and an exposed section 88*b*. The exposed section 88*b* of the heat conducting pins 88 extends out of the desiccant material sections 70 into adjacent ones of the moisture releasing channels $C_2$. Thus, the heat conducting pins 88 are disposed at a second flow path side of the desiccant material section 80 corresponding to the second flow path $A_2$.

Consequently, as ambient air flows along the first flow path $A_1$ and through the first moisture absorbing channels $C_1$, the heat conducting pins 86 eventually achieve the temperature of the air flowing through the first moisture absorbing channels $C_1$. Further, as heated air flows through the second moisture absorbing channels $C_2$, the heat conducting pins 88 eventually achieve the temperature of the air flowing along the second flow path $A_2$ and the second moisture absorbing channels $C_2$.

During normal operation of the air conditioning system 16, the desiccant assembly 14 absorbs moisture. However, at regular intervals, the moisture absorbed by the desiccant assembly 14 must be driven off by operation of the regeneration mechanism 41.

The regeneration mechanism 41 operates as follows. Heated air traveling through the heating duct 52 is directed from outlet end 62 of the heating duct 52 into the moisture releasing section of the desiccant assembly 14 along the second flow path $A_2$. Specifically, the outlet end 62 of the heating duct 52 is connected to an inlet side 14a of the desiccant assembly 14, as indicated in FIG. 2. Heated air travels through the desiccant assembly 14 along the second flow path $A_2$ and out a second side 14b of the desiccant assembly 14. The second side 14b of the desiccant assembly 14 preferably vents outside the vehicle 10.

Heated air fed through the heating duct 52 to the plurality of moisture releasing channels $C_2$ also flows over exposed surfaces of the corresponding desiccant layer 80. Hence, the desiccant layer 80 can release at least a portion of the moisture contained in the air flowing along the second flow path $A_2$.

When the desiccant regeneration mode begins (described below with respect to FIG. 8), the heat conducting pins 88 begin to absorb heat from the heated air passing from the heating duct 52 into the second moisture absorbing channels $C_2$. The heat conducting pins 88 transmit heat from the heated air into the desiccant layers 80 of the desiccant material sections 70. As the temperature of the desiccant layers 80 increases, moisture in the desiccant layers 80 is released into the air flowing through the moisture releasing channels $C_2$. A temperature differential begins to form in the desiccant layers 80. Hence, the heat conducting pins 86 may begin to transmit heat from the desiccant layers 80 of the desiccant material sections 70 into the air flowing through the moisture absorbing channels $C_1$. As a result, the temperature of the desiccant layers 80 at the moisture absorbing channels $C_1$ may be slightly reduced.

Eventually, the temperature gradient is established in the desiccant layers 80 such that each desiccant layer 80 achieves a heated side $S_H$ and a cooled side $S_C$, as indicated in FIG. 6. The heat conducting pins 86 take heat away from the cooled side $S_C$ of the desiccant layers 80 and the heat conducting pins 88 add heat to the heated side $S_H$ of the desiccant layers 80. The heat conducting pins 86 aid the cooled side $S_C$ of the desiccant layers 80 to more effectively absorb moisture from the air flowing through the moisture absorbing channels $C_1$. The heat conducting pins 88 aid the heated side $S_H$ of the desiccant layers 80 to more effectively release moisture to the air flowing through the moisture releasing channels $C_2$. During the desiccant regeneration mode (described below), the moisture absorbing capability of the desiccant assembly 14 can be slightly reduced as the heated side $S_H$ of the desiccant layers 80 increase in temperature. However, the desiccant assembly 14 continues to absorb moisture from the airflow through the first flow path $A_1$ even in the regeneration mode with the regeneration mechanism 41 in operation.

The increased temperature at the heated side $S_H$ of the desiccant layers 80 causes moisture within the desiccant layers 80 to evaporate. However, once the desiccant regeneration mode ends and both surfaces of the desiccant layers 80 have cooled down, the full moisture absorbing capabilities of the desiccant assembly 14 are restored.

As indicated in FIG. 2, the heater core 28, the heating duct 52, the moisture sensor 56 and the control unit 40 define the regeneration mechanism 41. The regeneration mechanism 41 is in fluid communication with the second air flow path $A_2$ of the desiccant assembly 14. The regeneration mechanism 41 is configured to effect removal of moisture from the desiccant assembly 14. More specifically, the heater core 28 is disposed within the air handler 34 downstream from the evaporator 38. The inlet end 60 of the heating duct 52 is in fluid communication with a portion of the air handler 34 downstream from the heater core 28. The outlet end 62 of the heating duct 52 is in fluid communication with (and is connected to) the second flow path $A_2$ at the inlet side 14a of the desiccant assembly 14. The moisture sensor 56 is disposed within the air handler 34 downstream from the desiccant assembly 14 and upstream from the evaporator 38. The valve 54 is installed in the heating duct 52 to selectively control the flow of heated air flowing through the heating duct 52 and into the desiccant assembly 14.

As best shown in FIG. 2, the control unit 40 is connected to stepper motor M, the valve 54 and the moisture sensor 56. Although not shown, the control unit 40 is also connected to the compressor 30 and a temperature sensor (not shown) located within the passenger compartment 26 or within the air handler 34. Since operation of the compressor 30 in response to signals from the temperature sensor (not shown) and/or a refrigerant pressure sensor (not shown) is conventional in nature, operation of the compressor 30 is omitted for the sake of brevity. Rather, description is provided with respect to the operation of the valve 54 in response to moisture levels downstream from the desiccant assembly 14.

The control unit 40 is configured to selectively operate the regeneration mechanism in response to moisture density readings from the moisture sensor 56 when the moisture sensor 56 provides a moisture or humidity reading that is above a predetermined moisture threshold. More specifically, when the moisture sensor 56 indicates an undesirable level of moisture (humidity) in air downstream from the desiccant assembly 14, the control unit 40 responds by opening the valve 54 thus starting the desiccant regeneration mode. With the valve 54 open, air heated by passage over coils of the heater core 28 is directed to flow into and through the heating duct 52 as indicated by the arrow $A_3$ and into the moisture absorbing channels $C_2$ along the second flow path $A_2$.

As the heated air passes though the moisture absorbing channels $C_2$ along the second flow path $A_2$, the heat conducting pins 88 absorb heat, causing the heated side $S_H$ of the desiccant layers 80 to heat up. As the temperature of the heated side $S_H$ of the desiccant layers 80 increases, moisture within the desiccant layers 80 evaporates into the air flowing though the moisture releasing channels $C_2$ along the second flow path $A_2$.

As the desiccant layers 80 release moisture at the heated side $S_H$ of the desiccant layers 80 the overall moisture content within the desiccant layers 80 begins to decrease.

With the valve 54 open, and with heated air passing through the moisture releasing channels $C_2$ along the second flow path $A_2$, a temperature gradient is established within each of the desiccant layers 80. Moisture is released from the heated side $S_y$ of the desiccant layers 80. Therefore, the desiccant material of the desiccant layers 80 is regenerated while in use. There is no need to replace the desiccant layers 80 since they release moisture on one surface (the heated side $S_H$) and absorb moisture at an opposite surface (the cooled side $S_C$).

Figure 8:
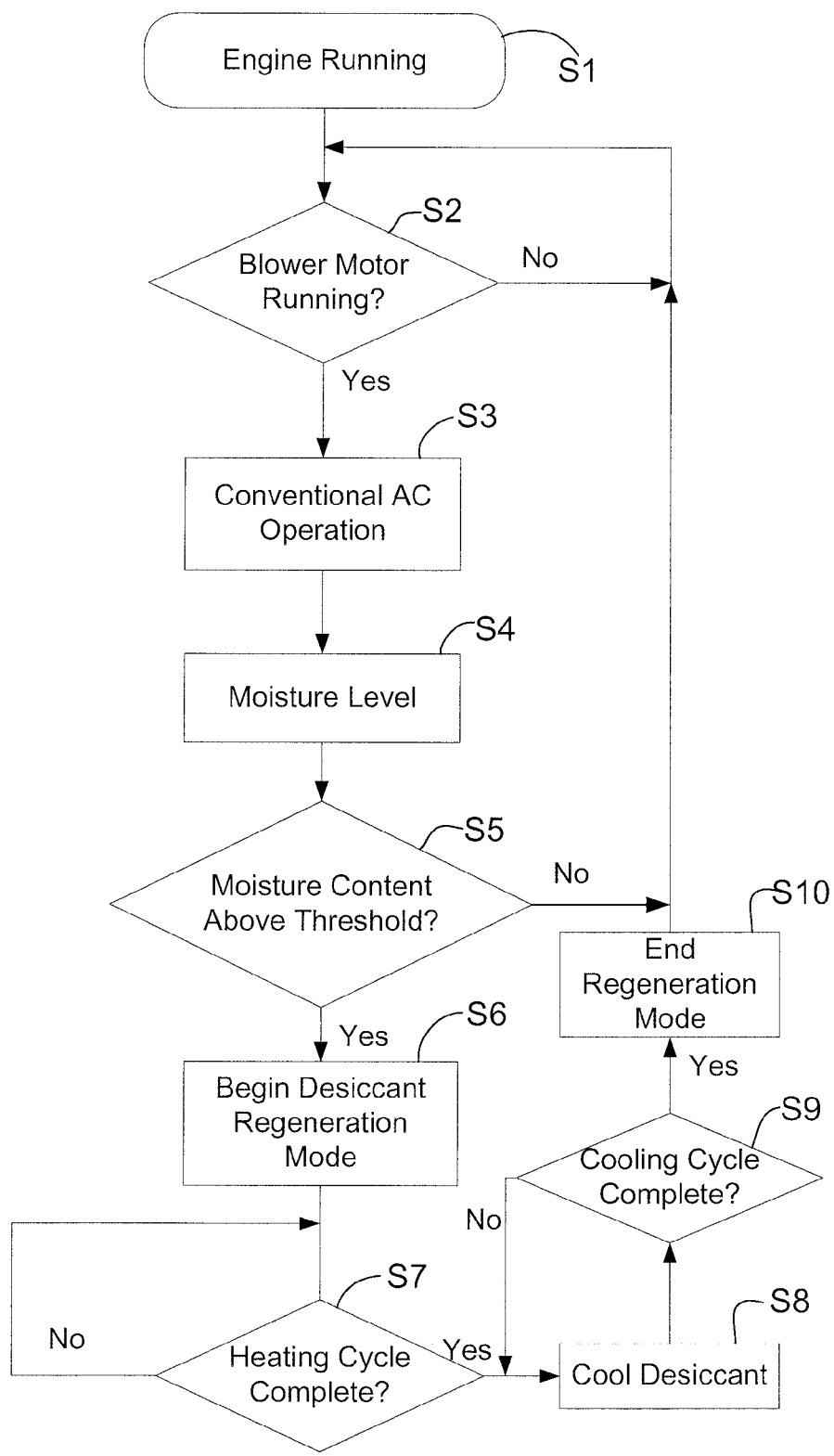
FIG. 8 is a flowchart showing basic steps of operation of the regeneration mechanism of the air conditioning system in accordance with the first embodiment of the present invention.

FIG. 8 is a flowchart depicting an example of the control logic conducted by the control unit 40. When the internal combustion engine 24 (motor) is operating or when the ignition key (not shown) is switched on, the control unit 40 is provided with power, as indicated at step S1. At step S2, the control unit 40 determines whether or not a vehicle occupant has turned on the blower 42, indicating that ventilation is required in the passenger compartment 26. If the blower 42 is turned off, the operation returns to step S2. If the blower 42 is on, then operation moves to step S3.

At step S3, the control unit 40 responds to conventional requests for heating and/or air conditioning, depending upon passenger settings selected by a passenger within the passenger compartment 26. For instance, if heat is required, the control unit 40 operates the motor M and positions the air mix blend door 48 to an appropriate orientation. If cooling is required, the compressor 30 is engaged to provide appropriately cooled refrigerant to the evaporator 38. The step S3 includes a series of operational steps (not shown), in addition to the steps depicted in FIG. 8. Since operation of the compressor 30 and positioning of the air mix blend door 48 are conventional operational steps, further description is omitted for the sake of brevity.

At step S4, the control unit 40 monitors signals from the moisture sensor 56. At step S5, the control unit 40 determines whether or not the moisture content of air downstream from the desiccant assembly 14 is above a predetermined moisture threshold. If the moisture content (humidity) is below the predetermined moisture threshold, then operation moves back to step S2. The valve 54 (part of the regeneration mechanism 41) is closed if it is currently open and remains closed if already closed. If the moisture content (humidity) is above the predetermined moisture threshold, then operation moves to step S6 where the valve 54 (part of the regeneration mechanism 41) is opened and the desiccant regeneration mode begins. Operation then moves to step S7.

At step S7, the control unit 40 begins a timing sequence for operating the regeneration mechanism 41. Specifically, the valve 54 is opened or if already open, remains open in a heating cycle. During the heating cycle at step S7, the feedback signals from the moisture sensor 56 are temporarily ignored by the control unit 40. Signals from the moisture sensor 56 are ignored until operation reaches step S10, as described below.

At step S7, the control unit 40 is programmed to keep the regeneration mechanism operating (keep the valve 54 open) for a predetermined amount of time. The predetermined length of time depends upon a number of factors, such as the type of desiccant material used in the desiccant assembly 14, the number of desiccant material sections 70, the overall surface area of each of the desiccant material sections 70 and the rate of flow of heated air passing through the valve 54 and the heating duct 52 (and other fluid dynamic related principles). The predetermined length of time is calculated such that the heating cycle promotes a maximum dissipation of moisture from the desiccant assembly 14 and minimum reduction of moisture removing capability of the desiccant assembly 14 with the air handling system 12 continuing to operate. For example, the designated time period can be at least 2 minutes or even longer (for example 5 minutes) depending upon the heat transfer characteristics of the desiccant material.

At step S7, if the predetermined time period has not elapsed yet, the heating cycle is not completed and operation loops and returns again to step S7. If the predetermined time period has elapsed, then the regeneration mode moves to step S8. At step S8, the valve 54 is closed stopping the flow of heated air into the desiccant assembly 14. Thus, the heat conducting pins 86 can reduce the temperature of the desiccant layers 80 down to a desirable level and resume full moisture absorbing capabilities of the desiccant assembly 14.

At step S9, the control unit 40 times the cooling cycle of the regeneration mode. Specifically, the control unit 40 continues to ignore signals from the moisture sensor 56 for a predetermined period of time to allow the desiccant assembly 14 to cool. Once the predetermined period of time for the cooling cycle has elapsed, operation moves to step S10 where the signals from the moisture sensor 56 resume. The control unit 40 then uses the signals from the moisture sensor 56 to monitor the moisture absorbing capabilities of the desiccant assembly 14. Operation returns to step S2 and the cycle begins again.

Second Embodiment Vacuum

Figure 9:
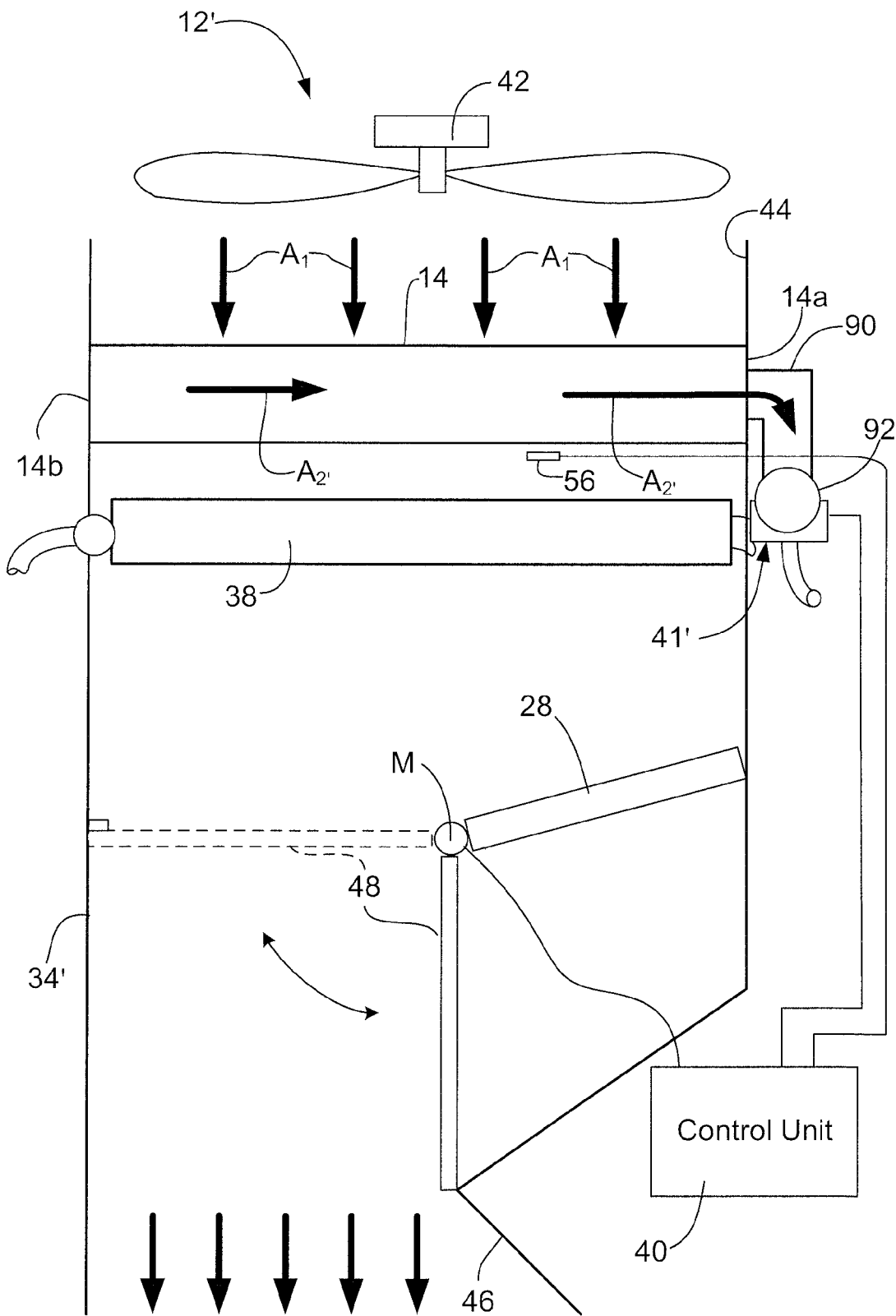
FIG. 9 is a schematic view of an air handling system similar to the one depicted in FIG. 1, showing an air handling assembly, a regeneration mechanism and a desiccant assembly having a first flow path configured to absorb moisture from air flowing therethrough and a second flow path configured to release moisture to air flowing therethrough in accordance with a second embodiment of the present invention.

Referring now to FIG. 9, an air handling system 12' with an air handler 34' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (') or provided with a new reference numeral.

The air handling system 12' of the second embodiment is very similar to the air handling system 12 of the first embodiment and includes many of the elements of the air handling system 12 of the first embodiment. Specifically, the air handling system 12' of the second embodiment includes an air handler 34' that is very similar to the air handler 34 of the first embodiment and includes many of the features of the air handler 34. Specifically, the air handler 34' includes the blower 42, the inlet 44, the outlet 46, the desiccant assembly 14, the evaporator 38, the air mix blend door 48, the stepper motor M, the heater core 28 and the moisture sensor 56. However, in the second embodiment, the regeneration mechanism 41, which includes the heating duct 52 and the valve 54 of the first embodiment, has been replaced with a regeneration mechanism 41'.

The desiccant assembly 14 is unchanged except that the second end 14b of the desiccant assembly 14 is sealed, as indicated in FIG. 9. More specifically, the moisture releasing channels $C_2$ are sealed at the second end 14b of the desiccant assembly 14. The inlet end 14a of the desiccant assembly 14 is connected to a duct 90 that is further connected to a vacuum pump 92. The second flow path $A_2$ of the first embodiment is reversed and therefore identified as a second flow path $A_2'$ that is more accurately characterized as a vacuum flow path.

In the second embodiment, the regeneration mechanism 41' comprises the vacuum pump 92 (a vacuum generating device) that is in fluid communication with the second flow path $A_2'$ of the desiccant assembly via the duct 90.

As in the first embodiment, the control unit 40 is connected to the vacuum pump 92 and controls the operation of the vacuum pump 92.

Figure 10:
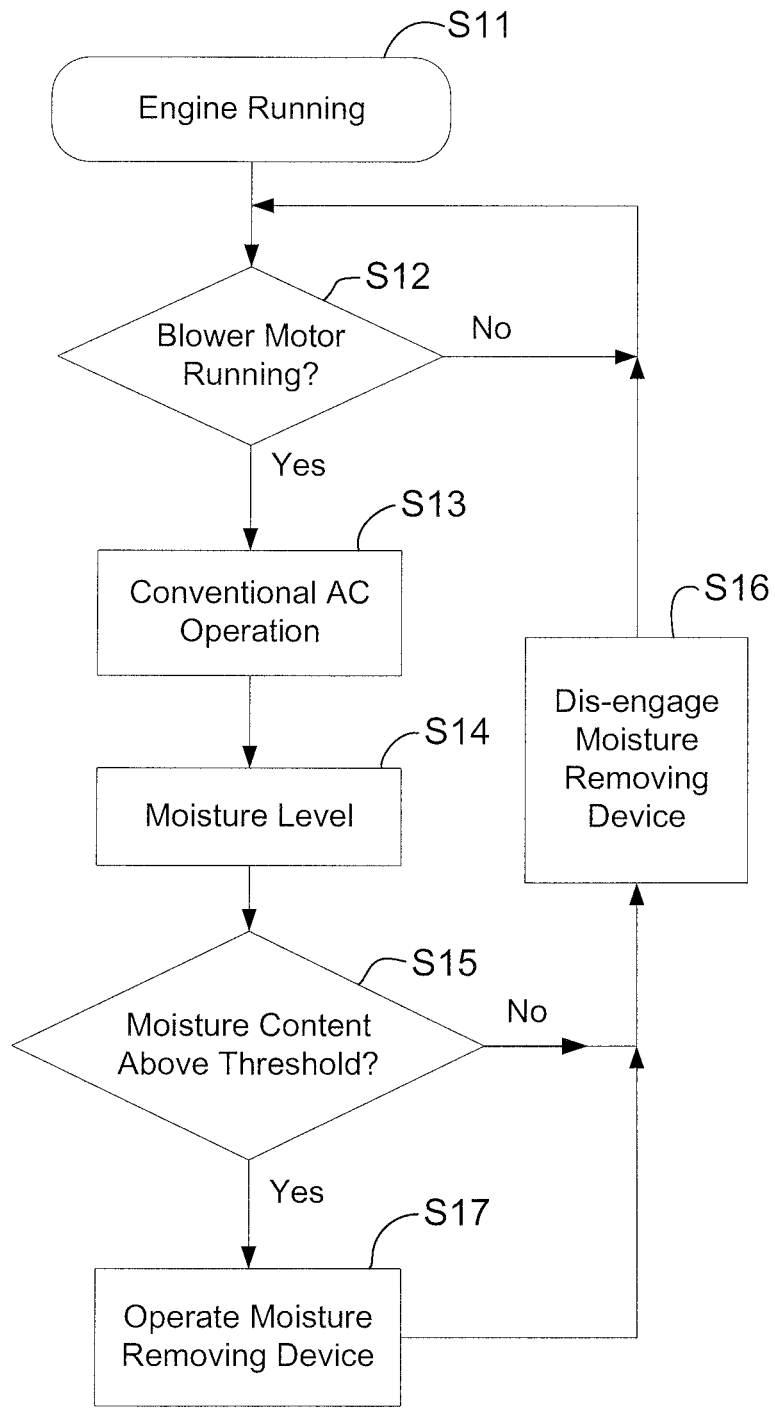
FIG. 10 is a flowchart showing basic steps of operation of the regeneration mechanism of the air conditioning system in accordance with the second embodiment of the present invention.

FIG. 10 is a flowchart depicting an example of the control logic conducted by the control unit 40. When the internal combustion engine 24 (motor) is operating or when the ignition key (not shown) is switched on, the control unit 40 is provided with power, as indicated at step S11. At step S12, the control unit 40 determines whether or not a vehicle occupant has turned on the blower 42 indicating that ventilation is required in the passenger compartment 26. If the blower 42 is turned off, the operation returns to step S12. If the blower 42 is on, then operation moves to step S13.

At step S13, the control unit 40 responds to conventional requests for heating and/or air conditioning, depending upon passenger settings selected by a passenger within the passenger compartment 26. For instance, if heat is required, the control unit 40 operates the motor M and positions the air mix blend door 48 to an appropriate orientation. If cooling is required, the compressor 30 is engaged to provide appropriately cooled refrigerant to the evaporator 38. The step S13 includes a series of operational steps (not shown), in addition to the steps depicted in FIG. 10. Since operation of the compressor 30 and positioning of the air mix blend door 48 are conventional operational steps, further description is omitted for the sake of brevity.

At step S14, the control unit 40 monitors signals from the moisture sensor 56. At step S15, the control unit 40 determines whether or not the moisture content of air downstream from the desiccant assembly 14 is above a predetermined moisture threshold. If the moisture content (humidity) is below the predetermined moisture threshold, then operation moves to step S16. In step S16, the status of the vacuum pump 92 (the regeneration mechanism) is checked. If the vacuum pump 92 is operating, it is shut off. If the regeneration mechanism 41' is off, it remains off and operation moves back to step S12.

At step S15, if the moisture content (humidity) is above the predetermined moisture threshold, then operation moves to step S17 where the vacuum pump 92 (the regeneration mechanism) is operated for a predetermined period of time and the desiccant regeneration mode begins. The predetermined period of time is determined based upon the properties of the desiccant assembly 14 in response to a vacuum being applied to draw out moisture therefrom. However, a time period of between 3 and 5 minutes is believed to be an appropriate amount of time in the depicted embodiment. After the predetermined period of time elapses, operation then moves to step S16.

In the second embodiment, when the vacuum pump 92 (the regeneration mechanism) is operated by the control unit 40, a vacuum is generated within the moisture releasing channels $C_2$ of the desiccant assembly 14. Therefore, instead of a temperature gradient forming in the desiccant layers 80, a pressure gradient is formed instead. Hence, moisture migrates through the desiccant layers 80 from the moisture absorbing channels $C_1$ to the moisture releasing channels $C_2$. Moisture is thereby removed from the desiccant layers 80. The vacuum pump 92 vents the moisture to ambient air outside of the vehicle 10.

In the second embodiment, the desiccant assembly 14 can include the heat conducting pins 86 and the heat conducting pins 88. Alternatively, the heat conducting pins 86 and the heat conducting pins 88 can be omitted in the second embodiment. The vacuum pump 92 can also optionally be operated continuously in order to sustain an appropriate constant pressure gradient.

Third Embodiment

Figure 11:
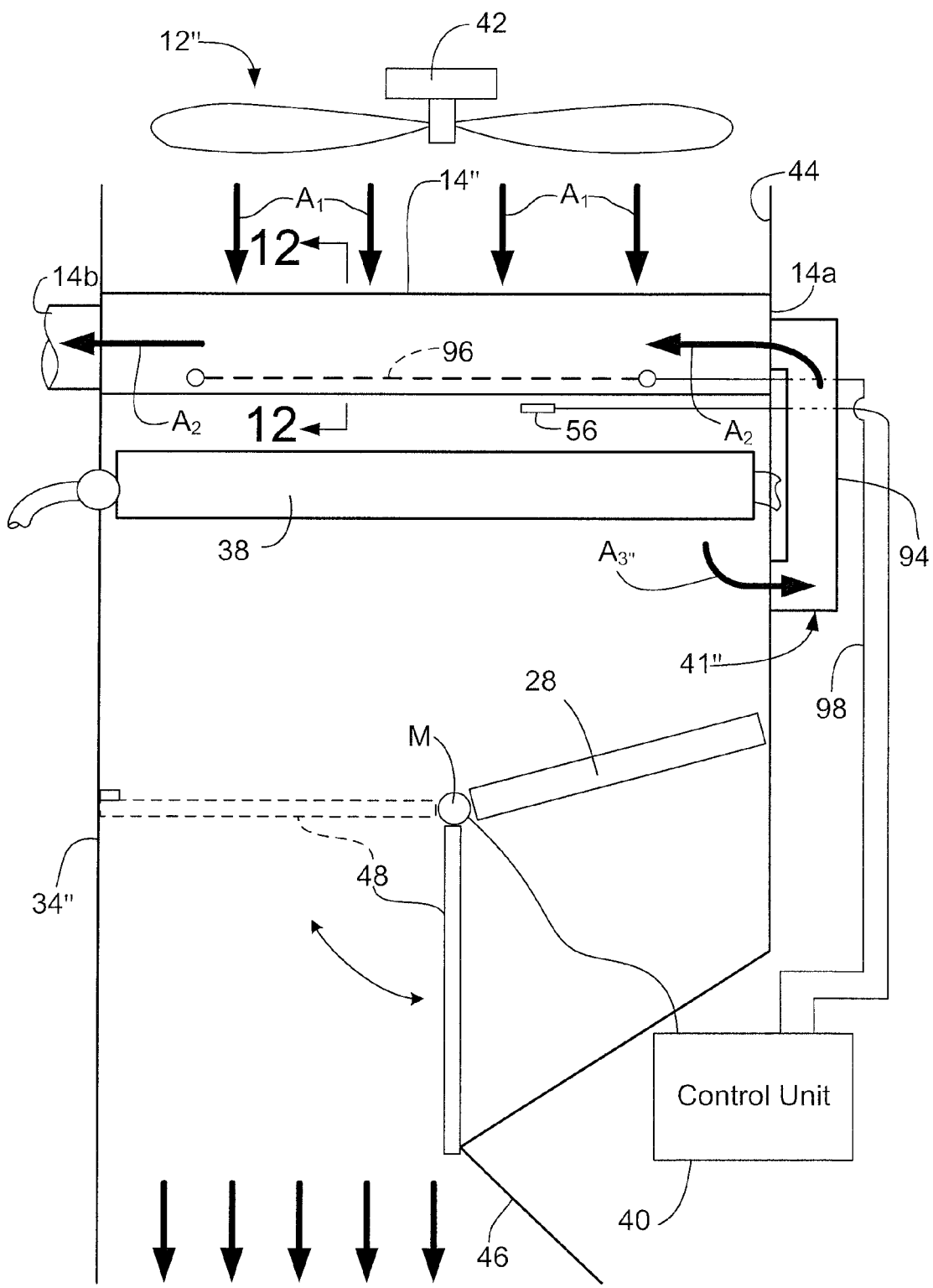
FIG. 11 is a schematic view of an air handling system similar to the one depicted in FIG. 1, showing an air handling assembly, a regeneration mechanism and a desiccant assembly having a first flow path configured to absorb moisture from air flowing therethrough and a second flow path configured to release moisture to air flowing therethrough in accordance with a third embodiment of the present invention.
Figure 12:
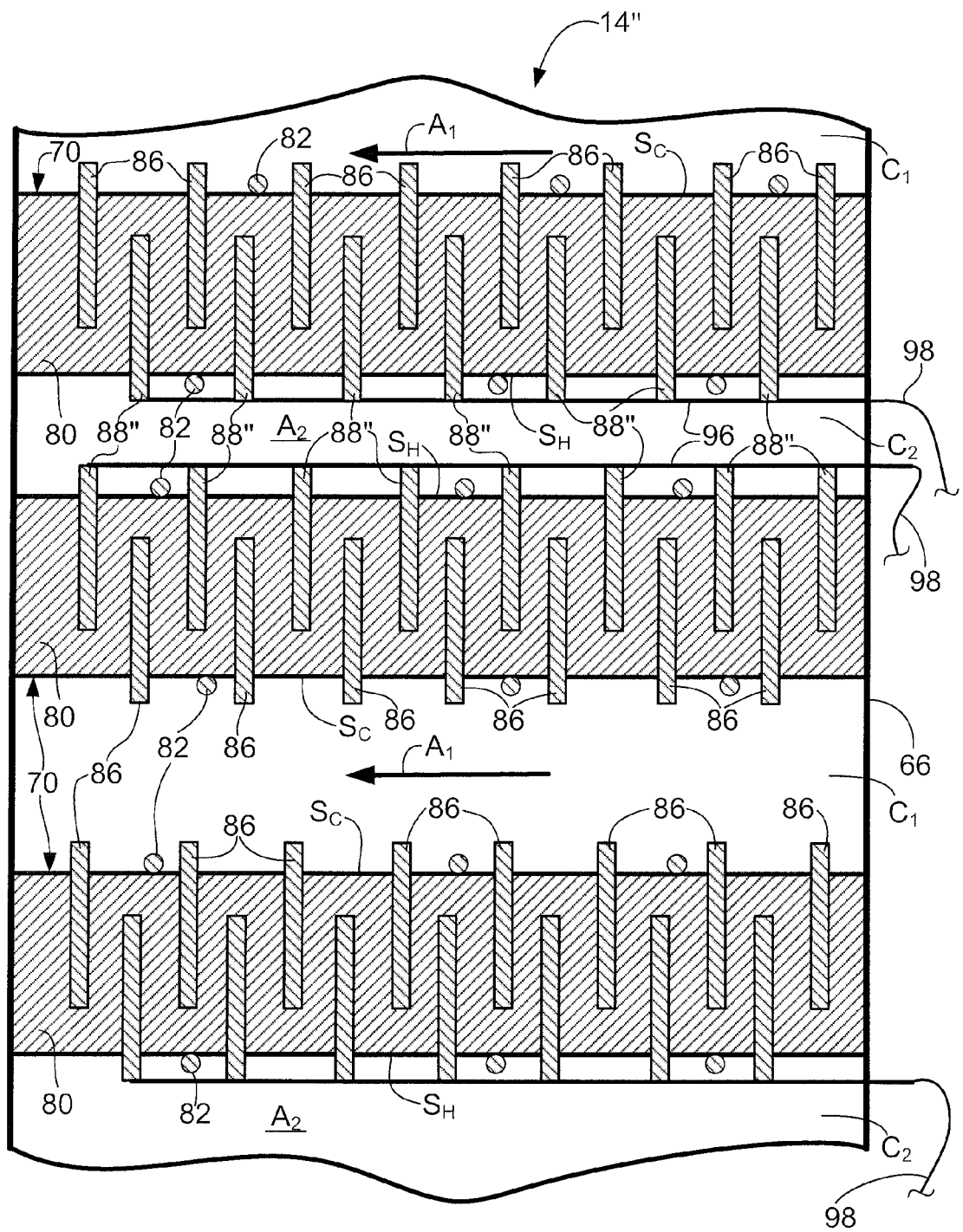
FIG. 12 is a schematic cross-sectional view of the desiccant assembly taken along the line 12-12 in FIG. 11, showing heat conducting pins and heating elements at least partially disposed within desiccant material in accordance with the third embodiment of the present invention.

Referring now to FIGS. 11 and 12, an air handling system 12" having an air handler 34" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (") or provided with a new number.

The air handling system 12" of the third embodiment is very similar to the air handling system 12 of the first embodiment and includes many of the elements of the air handling system 12 of the first embodiment. Specifically, the air handling system 12" of the third embodiment includes an air handler 34" that is very similar to the air handler 34 of the first embodiment and includes many of the features of the air handler 34. Specifically, the air handler 34" includes the blower 42, the inlet 44, the outlet 46, the evaporator 38, the air mix blend door 48, the stepper motor M, the heater core 28 and the moisture sensor 56. However, in the third embodiment, the regeneration mechanism 41, which includes the heating duct 52 and the valve 54 of the first embodiment, has been replaced with a regeneration mechanism 41" and the desiccant assembly 14 has been replaced with a desiccant assembly 14". Specifically, the heating duct 52 and the valve 54 of the first embodiment are replaced with a venting duct 94. The venting duct 94 is configured to direct air from within air handler 34" downstream from the evaporator 38 to the inlet end 14a of the desiccant assembly 14" along a flow path indicated by the arrow $A_{3'''}$.

As best shown in FIG. 12, the desiccant assembly 14" has all the features of the desiccant assembly 14 of the first embodiment, except that the heat conducting pins 88 have been replaced with heating elements 88". More specifically, the desiccant assembly 14" includes the inlet side 14a (FIG. 11), the second side 14b (FIG. 11), the first flow path $A_1$, the second flow path $A_2$, the frame 66, the plurality of desiccant material sections 70 including the desiccant layers 80, the heated side $S_H$, the cooled side $S_C$, the plurality of wire or mesh elements 82, the end panels 72 (not shown in FIGS. 11 and 12), the end panels 74 (not shown in FIGS. 11 and 12), the top panel 76 (not shown in FIGS. 11 and 12), the bottom panel 78 (not shown in FIGS. 11 and 12), the plurality of moisture absorbing channels $C_1$, the plurality of moisture releasing channels $C_2$ and the heat conducting pins 86. The heating elements 88" are provided with electric power by wires 96 that are connected by lines 98 to the control unit 40.

In the third embodiment, a temperature gradient is established in the desiccant material sections 70 by the heat transferring capabilities of the heat conducting pins 86 and electrical heating provided by the heating elements 88". The heating elements 88" are selectively powered by the control unit 40 in response to moisture content indications provided by the moisture sensor 56. The heating elements 88" are positioned in a manner similar to the heating elements 88 of the first embodiment. Specifically, the heating elements 88" are disposed at the second flow path $A_2$ of the desiccant layers 80 and selectively controlled by the control unit 40 in a manner consistent with the steps shown and described above with respect to FIG. 8. Specifically, the regeneration mechanism 41" of the third embodiment comprises the heating elements 88". The steps of operation of the regeneration mechanism 41 of the first embodiment shown in FIG. 8 and described above are also used with the regeneration mechanism 41" in the third embodiment. The same heating cycle and cooling cycle of the first embodiment also apply to the regeneration mechanism 41" of the third embodiment.

In an alternative configuration, the heat conducting pins 86 can be replaced with cooling elements in the first flow path $A_1$ of the desiccant layers 80 that are selectively controlled by the control unit 40.

The control unit 40 in all three embodiments of the present invention preferably includes a microcomputer with an air conditioning control program that controls the compressor 30 and also includes programming or circuitry for implementing the above described operational steps (shown in FIGS. 8 and 10) for controlling the regeneration mechanism as discussed below. The control unit 40 can also include other conventional components such as an input interface circuit, an output interface circuit, and storage devices such as a ROM (Read Only Memory) device and a RAM (Random Access Memory) device. The microcomputer of the control unit 40 is programmed to control the operation of the air conditioning system 16 and the above described regeneration mechanism. The memory circuit stores processing results and control programs such as ones for air conditioner and regeneration mechanism operation that are run by the processor circuit. The control unit 40 is operatively coupled to the compressor 30 and related portions of the air conditioning system 16 in a conventional manner. The internal RAM of the control unit 40 stores statuses of operational flags and various control data.

The various features and components of the vehicle 10 and portions of the air conditioning system 16 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions with respect to a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air handling system comprising:
   an air handler having an air inlet configured to receive airflow into the air handler and an air outlet configured to direct the airflow from the air handler to a passenger compartment of a vehicle, the air outlet being located downstream from the air inlet;
   a desiccant assembly installed downstream from the air inlet and upstream from the air outlet in a fixed non-movable orientation within the air handler, the desiccant assembly being configured to absorb moisture from the airflow and having a first flow path and a second flow path separated from one another such that the airflow passes through the first flow path;
   a regeneration mechanism in fluid communication with the second flow path of the desiccant assembly configured to remove moisture from the desiccant assembly;
   an air duct having a first end and a second end, the first end being directly connected to the air handler such that the first end is in fluid communication with a portion of the air handler downstream from the air inlet and upstream from the air outlet, the second end being directly connected to the desiccant assembly such that a portion of the airflow is directed through the air duct and into the second flow path, and
   a heater core disposed within the air handler downstream from the desiccant assembly with the first end of the air duct being connected to the air handler downstream from the heater core; and
   a blower operable to direct air from the inlet of the air handler to the air duct and through the second flow path of the desiccant assembly.

2. The vehicle air handling system according to claim 1 wherein
   the air handler further comprises:
   an air conditioning evaporator disposed within the air handler downstream from the desiccant assembly.

3. A vehicle air handling system comprising:
   an air handler having an air inlet receiving airflow into the air handler and an air outlet directing the airflow from the air handler to a passenger compartment of a vehicle, the air outlet being located downstream from the air inlet;
   a desiccant assembly installed downstream from the air inlet and upstream from the air outlet in a fixed non-movable orientation within the air handler, the desiccant assembly absorbing moisture from the airflow and having a first flow path and a vacuum flow path separated from the first flow path such that the airflow passes through the first flow path, the vacuum flow path being sealed at a first end thereof preventing flow of air therethrough; and a regeneration mechanism that includes:
: a moisture sensor disposed within the air handler downstream from the desiccant assembly and upstream from the air outlet;
: a vacuum generating device in fluid communication with a second end of the vacuum flow path of the desiccant assembly, the vacuum generating device being selectively operable to generate a vacuum within the vacuum flow path drawing moisture from the desiccant material of the desiccant assembly; and
: a control unit configured to selectively operate the regeneration mechanism in response to moisture density readings from the moisture sensor being above a predetermined moisture threshold.

4. The vehicle air handling system according to claim 1 wherein
the first flow path includes a plurality of moisture absorbing channels that direct airflow in a first direction and the second flow path includes a plurality of moisture releasing channels that direct air flow in a second direction, the first and second directions being angularly offset from one another.

5. The vehicle air handling system according to claim 4 wherein
the second direction is perpendicular to the first direction.

6. The vehicle air handling system according to claim 1 wherein
the first flow path and the second flow path of the desiccant assembly are separated from one another by a desiccant material.

7. The vehicle air handling system according to claim 6 wherein
the desiccant material comprises clay.

8. The vehicle air handling system according to claim 6 wherein
the desiccant assembly includes a plurality of heat conducting elements having embedded sections extending into the desiccant material and exposed sections that project into at least one of the first flow path and the second flow path.

9. The vehicle air handling system according to claim 6 wherein
the desiccant assembly has a first flow path side and a second flow path side, and includes a plurality of heating elements having embedded sections extending into the desiccant material from the second flow path side of the desiccant material.

10. The vehicle air handling system according to claim 1 wherein
the desiccant assembly comprises a frame with a desiccant material disposed within the frame, the desiccant material dimensioned and shaped to define the first and second flow paths.

11. The vehicle air handling system according to claim 4 wherein
the plurality of moisture absorbing channels and the plurality of moisture releasing channels are alternatingly arranged with respect to one another,
the desiccant assembly including a plurality of desiccant material layers, the desiccant material layers separating adjacent ones of the plurality of moisture absorbing channels from adjacent ones of the plurality of moisture releasing channels.

12. A vehicle air handling system comprising:
an air handler having an air inlet configured to receive airflow into the air handler and an air outlet configured to direct the airflow from the air handler to a passenger compartment of a vehicle, the air outlet being located downstream from the air inlet;
a desiccant assembly installed downstream from the air inlet and upstream from the air outlet in a fixed non-movable orientation within the air handler, the desiccant assembly being configured to absorb moisture from the airflow and having a first flow path and a second flow path separated from one another such that the airflow passes through the first flow path;
a regeneration mechanism comprising a moisture sensor disposed within the air handler downstream from the desiccant assembly and upstream from the air outlet, and a control unit configured to selectively operate the regeneration mechanism in response to moisture density readings from the moisture sensor being above a predetermined moisture threshold, the regeneration mechanism being in fluid communication with the second flow path of the desiccant assembly configured to remove moisture from the desiccant assembly;
an air duct having a first end and a second end, the first end being directly connected to the air handler such that the first end is in fluid communication with a portion of the air handler downstream from the air inlet and upstream from the air outlet, the second end being directly connected to the desiccant assembly such that a portion of the airflow is directed through the air duct and into the second flow path;
a heater core disposed within the air handler downstream from the desiccant assembly with the first end of the air duct being connected to the air handler upstream from the heater core; and
a blower operable to direct air from the inlet of the air handler to the air duct and through the second flow path of the desiccant assembly,
wherein
the desiccant assembly has a first flow path side and a second flow path side, and the regeneration mechanism includes a heat producing section controlled by the control unit for selectively heating the desiccant assembly from the second flow path side of the desiccant assembly.

13. The vehicle air handling system according to claim 3 wherein
the desiccant assembly includes a desiccant material disposed between the first flow path and the vacuum flow path.

14. The vehicle air handling system according to claim 13 wherein
the desiccant assembly includes a plurality of heat conducting elements having embedded sections extending into the desiccant material and exposed sections that project into at least one of the first flow path and the vacuum flow path.

15. The vehicle air handler system according to claim 1, wherein
the regeneration mechanism is configured to continuously alternate between supplying heat to the second flow path of the desiccant assembly and cooling the desiccant assembly.

16. The vehicle air handling system according to claim 3 wherein
the first flow path includes a plurality of moisture absorbing channels that direct airflow in a first direction and the vacuum flow path includes a plurality of moisture releasing channels that extend in a second direction, the first and second directions being angularly offset from one another.

17. The vehicle air handling system according to claim 3 wherein
> the desiccant assembly comprises a frame with a desiccant material disposed within the frame, the desiccant material dimensioned and shaped to define the first flow path and the vacuum flow path.

* * * * *